US009644612B2

(12) United States Patent
Evans et al.

(10) Patent No.: US 9,644,612 B2
(45) Date of Patent: May 9, 2017

(54) SYSTEMS AND METHODS FOR VALIDATING WIND FARM PERFORMANCE MEASUREMENTS

(71) Applicant: General Electric Company, Schenectady, NY (US)

(72) Inventors: Scott Charles Evans, Burnt Hills, NY (US); Zhanpan Zhang, Niskayuna, NY (US); Peter Alan Gregg, Niskayuna, NY (US); Satish G. Iyengar, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 333 days.

(21) Appl. No.: 14/493,464

(22) Filed: Sep. 23, 2014

(65) Prior Publication Data

US 2016/0084233 A1    Mar. 24, 2016

(51) Int. Cl.
*G01M 19/00*    (2006.01)
*F03D 11/00*    (2006.01)
(Continued)

(52) U.S. Cl.
CPC .......... *F03D 11/0091* (2013.01); *F03D 7/048* (2013.01); *F03D 9/005* (2013.01);
(Continued)

(58) Field of Classification Search
USPC .............. 73/1.27, 1.28, 112.01, 112.03, 147
See application file for complete search history.

(56) References Cited

U.S. PATENT DOCUMENTS 7,603,202 B2    10/2009   Weitkamp
8,249,852 B2 *   8/2012   Thulke ................... F03D 7/045
                                                             290/44
(Continued)

FOREIGN PATENT DOCUMENTS

EP          1817496 B1      10/2013
GB          2477968 A        8/2011
WO       2010000664 A2       1/2010

OTHER PUBLICATIONS

"Wind Turbines—Part 12-2: Power performance of electricity producing wind turbines based on nacelle anemometry", Internet Citation, Jul. 18, 2008, pp. 1-95.
(Continued)

*Primary Examiner* — Eric S McCall
(74) *Attorney, Agent, or Firm* — Nitin N. Joshi (57) ABSTRACT

The present disclosure is directed to systems and methods for validating and/or identifying wind farm performance measurements so as to optimize wind farm performance. The method includes measuring operating data from one or more wind turbines of the farm. Another step includes generating a plurality of baseline models of performance of the wind farm from at least a portion of the operating data. Thus, each of the baseline models of performance is developed from a different portion of operating data so as to provide comparable models. The method also includes selecting an optimal baseline model and comparing the optimal baseline model with actual performance of the wind farm. In a particular embodiment, the actual performance of the wind farm is determined after one or more wind turbines of the wind farm is modified by one or more upgrades.

19 Claims, 11 Drawing Sheets

(51) Int. Cl.
*F03D 9/00* (2016.01)
*F03D 7/04* (2006.01)
*H02J 3/00* (2006.01)
*H02J 3/38* (2006.01)
*F03D 17/00* (2016.01)

(52) U.S. Cl.
CPC .............. *F03D 17/00* (2016.05); *H02J 3/00* (2013.01); *H02J 3/386* (2013.01); *F05B 2260/84* (2013.01); *F05D 2270/20* (2013.01); *F05D 2270/335* (2013.01); *H02J 2003/007* (2013.01); *Y02E 10/723* (2013.01); *Y02E 10/763* (2013.01); *Y02E 60/76* (2013.01); *Y04S 40/22* (2013.01)

(56) References Cited

U.S. PATENT DOCUMENTS

| | | | | |
|---|---|---|---|---|
| 8,853,877 | B1* | 10/2014 | Zalar | F03D 7/048 290/44 |
| 2008/0086281 | A1 | 4/2008 | Santos | |
| 2010/0152905 | A1 | 6/2010 | Kusiak | |
| 2011/0020122 | A1 | 1/2011 | Parthasarathy et al. | |
| 2011/0049883 | A1 | 3/2011 | Hatch et al. | |
| 2011/0106680 | A1 | 5/2011 | Vittal et al. | |
| 2011/0145277 | A1 | 6/2011 | Gadre et al. | |
| 2011/0175353 | A1 | 7/2011 | Egedal et al. | |
| 2012/0083933 | A1 | 4/2012 | Subbu et al. | |
| 2014/0172329 | A1 | 6/2014 | Zhang et al. | |
| 2015/0086357 | A1* | 3/2015 | Gregg | F03D 7/046 416/1 |
| 2015/0101401 | A1* | 4/2015 | Ekanayake | G01W 1/02 73/112.01 |
| 2016/0084224 | A1* | 3/2016 | Tyber | F03D 7/048 700/287 |

OTHER PUBLICATIONS

International Search Report and Written Opinion issued in connection with corresponding PCT Application No. PCT/US2015/051186 dated Nov. 9, 2015.

Article—Towards Wind Farm Performance Optimization through Empirical Models, Aerospace Conference, 2014 IEEE, Mar. 1-8, 2014, Evans at al., pp. 1-12.

Abstract Only—Anticipatory Control of Wind Turbines with Data-Driven Predictive Models, Energy Conversion, IEEE Transactions, Sep. 2009, Kusiak et al., vol. 24, Issue 3, pp. 766-774.

Abstract Only—Fuzzy Modeling Techniques and Artificial Keurai Networks to Estimate Annual Energy Output of a Wind Turbine, Renewable Energy, 2010, Jafarian et al., vol. 35, Issue 9, pp. 2098-2014.

* cited by examiner

SYSTEMS AND METHODS FOR VALIDATING WIND FARM PERFORMANCE MEASUREMENTS

FIELD OF THE INVENTION

The present disclosure relates generally to wind farms and, more particularly, to systems and methods for validating wind farm performance improvement measurements, e.g. power output.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm may also be provided. The correlation of meteorological data with power output provides the empirical determination of a "power curve" for the individual wind turbines.

Typically, in a wind farm, each wind turbine attempts to maximize its own power output while maintaining its fatigue loads within desirable limits. To this end, each turbine includes a control module, which attempts to maximize power output of the turbine in the face of varying wind and grid conditions, while satisfying constraints like sub-system ratings and component loads. Based on the determined maximum power output, the control module controls the operation of various turbine components, such as the generator/power converter, the pitch system, the brakes, and the yaw mechanism to reach the maximum power efficiency.

Often, while maximizing the power output of a single wind turbine, neighboring turbines may be negatively impacted. For example, downwind turbines may experience large wake effects caused by an upwind turbine. Wake effects include reduction in wind speed and increased wind turbulence downwind from a wind turbine typically caused by the conventional operation of upwind turbines (i.e. for maximum power output). Because of these wake effects, downwind turbines receive wind at a lower speed, drastically affecting their power output (as power output is proportional to wind speed). Moreover, wind turbulence negatively affects the fatigue loads placed on the downwind turbines, and thereby affects their life (as life is proportional to fatigue loads). Consequently, maximum efficiency of a few wind turbines may lead to sub-optimal power output, performance, or longevity of other wind turbines in the wind farm. Thus, modern control technologies attempt to optimize the wind farm power output rather than the power outputs of each individual wind turbine.

In addition, there are many products, features, and/or upgrades available for wind turbines and/or wind farms so as to increase power output or annual energy production (AEP) of the wind farm. Once an upgrade has been installed, it is advantageous to efficiently determine various wind turbine performance improvement measurements so as to verify the benefit of the upgrade. For example, a typical method for assessing wind turbine performance measurements is to baseline power against wind speed as assessed by the turbine nacelle anemometer. The nacelle anemometer approach, however, is sometimes hindered due to imprecision of nacelle anemometer measurements and the projection of these measurements into AEP estimates. Further, such an approach may be less preferred than use of an external met mast in front of a wind turbine, but is in widespread use due to the generally prohibitive cost of the met mast approach. In addition, even when nacelle anemometers are calibrated correctly, individual wind power curve methods are not able to discern the benefit of upgrades, such as wake minimization technologies, that can create more wind for the farm to use. In view of the aforementioned issues, still another approach for assessing wind turbine performance measurements is to baseline performance against a control turbine in close proximity to a turbine of interest. Such an approach, however, is subject to the availability of the control turbine and further inaccuracies due to reliance on a single, more distant sensor. Thus, it is difficult to show the benefit of upgrades to individual turbines.

Accordingly, there is a need for improved systems and methods for validating wind farm performance improvement measurements that address the aforementioned issues. Thus, the present disclosure is directed to systems and methods for baselining wind turbine performance measurements using multi-feature estimation that normalizes AEP uncertainty estimates.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for validating wind farm performance measurements after one or more upgrades have been installed. The method includes measuring operating data, via one or more sensors, from one or more wind turbines of the wind farm. Another step includes generating, via a processor, a plurality of baseline models of performance of the wind farm (e.g. power output) from at least a portion of the operating data. Thus, each of the baseline models of performance is developed from a different portion of operating data so as to provide comparable models. The method also includes selecting, via the processor, an optimal baseline model of performance from the plurality of baseline models. Still another step includes comparing, via the processor, the optimal baseline model of performance and an actual performance of the wind farm, wherein the actual performance of the wind farm is determined after one or more wind turbines of the wind farm are modified by the one or more upgrades.

In another aspect, the present disclosure is directed to a method for identifying one or more wind farm performance measurements. The method includes measuring operating data, via one or more sensors, from one or more wind turbines of the wind farm. Another step includes generating, via a processor, a plurality of baseline models of power output of the wind farm from at least a portion of the operating data, wherein each of the baseline models is developed from a different portion of the operating data. Yet another step includes evaluating performance of each of the baseline models by comparing each baseline model to an actual power output of the wind farm. A further step includes selecting an optimal baseline model based on the evaluation. Thus, the method also includes identifying, via the processor, one or more wind farm performance measurements of the wind farm based on the optimal baseline model, wherein the wind farm performance measurements are indicative of an error occurring in the wind farm.

In yet another aspect, the present disclosure is directed to a system for validating wind farm performance measurements produced by one or more upgrades. The system includes a plurality of sensors configured to measure operating data from one or more wind turbines in a wind farm and a controller configured to perform one or more operations. The operations include, at least, generating a plurality of baseline models of performance of the wind farm from at least a portion of the operating data, wherein each of the baseline models is developed from a different portion of the operating data. Further operations include selecting an optimal baseline model of performance from the plurality of baseline models, and comparing the optimal baseline model of performance and an actual performance of the wind farm, wherein the actual performance of the wind farm is determined after one or more wind turbines of the wind farm are modified by the one or more upgrades. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and methods for validating or identifying wind farm performance measurements in a wind farm. For example, in one embodiment, the system is configured to validate wind farm performance measurements, i.e. power output, in response to one or more upgrades installed within the wind farm so as to optimize wind farm performance. Alternatively, the system may be configured to identify wind farm performance measurements (i.e. problems or errors) in a wind farm, such as, for example misconfigurations, material or software failures, and/or other problematic circumstances causing sub-par performance of the wind farm.

In various embodiments, a farm controller is configured to estimate an annual energy production (AEP) change after an upgrade is installed for one or more wind turbines (e.g. turbine(s) of interest) of the wind farm. More specifically, the farm controller is configured to receive and store operating data collected from a plurality of wind turbines (including the turbine(s) of interest) of the wind farm measured by one or more sensors. The farm controller then generates a plurality of baseline models of performance of the wind farm (e.g. power output) from the operating data. For example, in one embodiment, the farm controller selects a plurality of subsets of wind turbines from the wind farm to form the baseline models that do not include the turbine(s) of interest and selects the model that achieves the best accuracy, namely the optimal baseline model. The farm controller then compares the optimal baseline model of performance with the actual performance of the wind farm after one or more upgrades have been installed. For example, in one embodiment, the controller compares the optimal baseline model of power output with the actual power output and determines the associated uncertainty of the power output change. It should be understood that the upgrades may include any suitable upgrade now known or later developed in the art, including but not limited to rotor blade chord extensions, software upgrades, controls upgrades, hardware upgrades, wake controls, aerodynamic upgrades, blade tip extensions, vortex generators, winglets, or similar. Accordingly, the farm controller is configured to validate wind farm performance improvements (such as improvements in wind farm power) that occur in response to at least one upgrade being installed.

The present disclosure has many advantages not present in the prior art. For example, the present disclosure leverages and fuses accurate available sensor data using machine learning algorithms. That is, the more relevant, good quality sensors used, and the more data pooled in like conditions, the lower the predictive error of the optimal baseline model will be. Thus, accuracy of wind farm performance improvement measurements may be improved and associated costs and times may be reduced.

Figure 1:
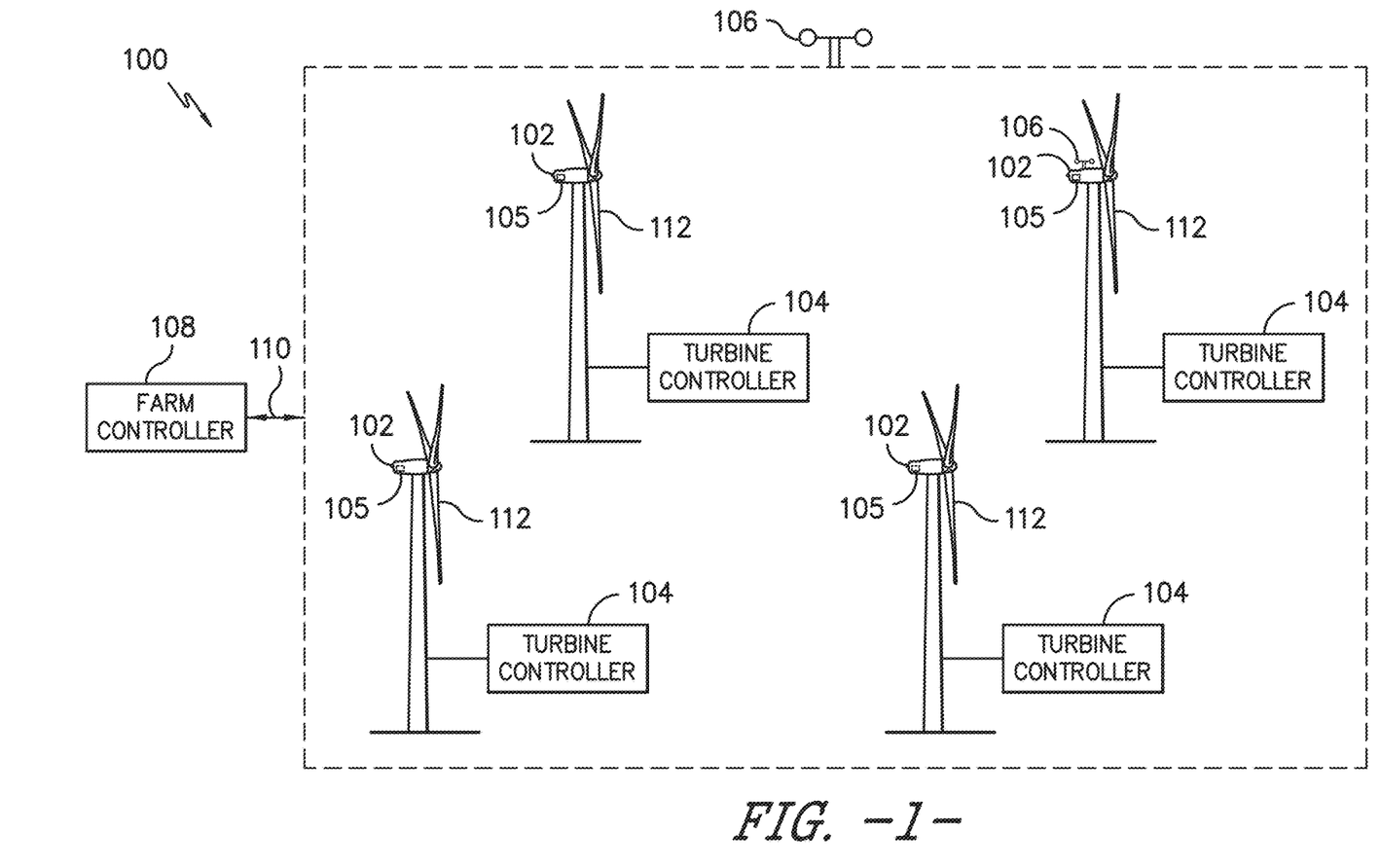
FIG. 1 illustrates a perspective view of one embodiment of a wind farm according to the present disclosure.
Figure 10:
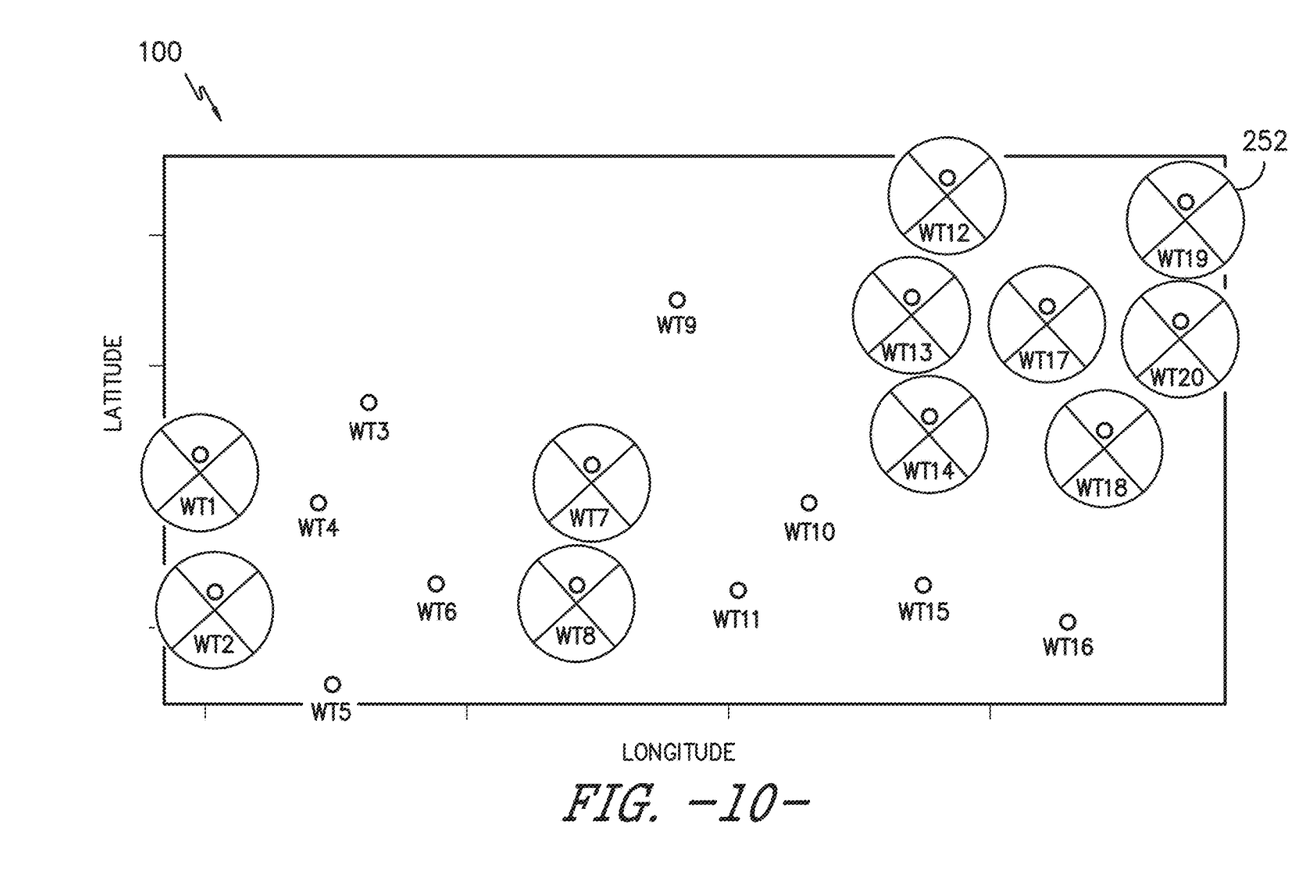
FIG. 10 illustrates a layout of one embodiment of a wind farm particularly illustrating selected wind turbines of one of the baseline models according to the present disclosure.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 10 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

Figure 2:
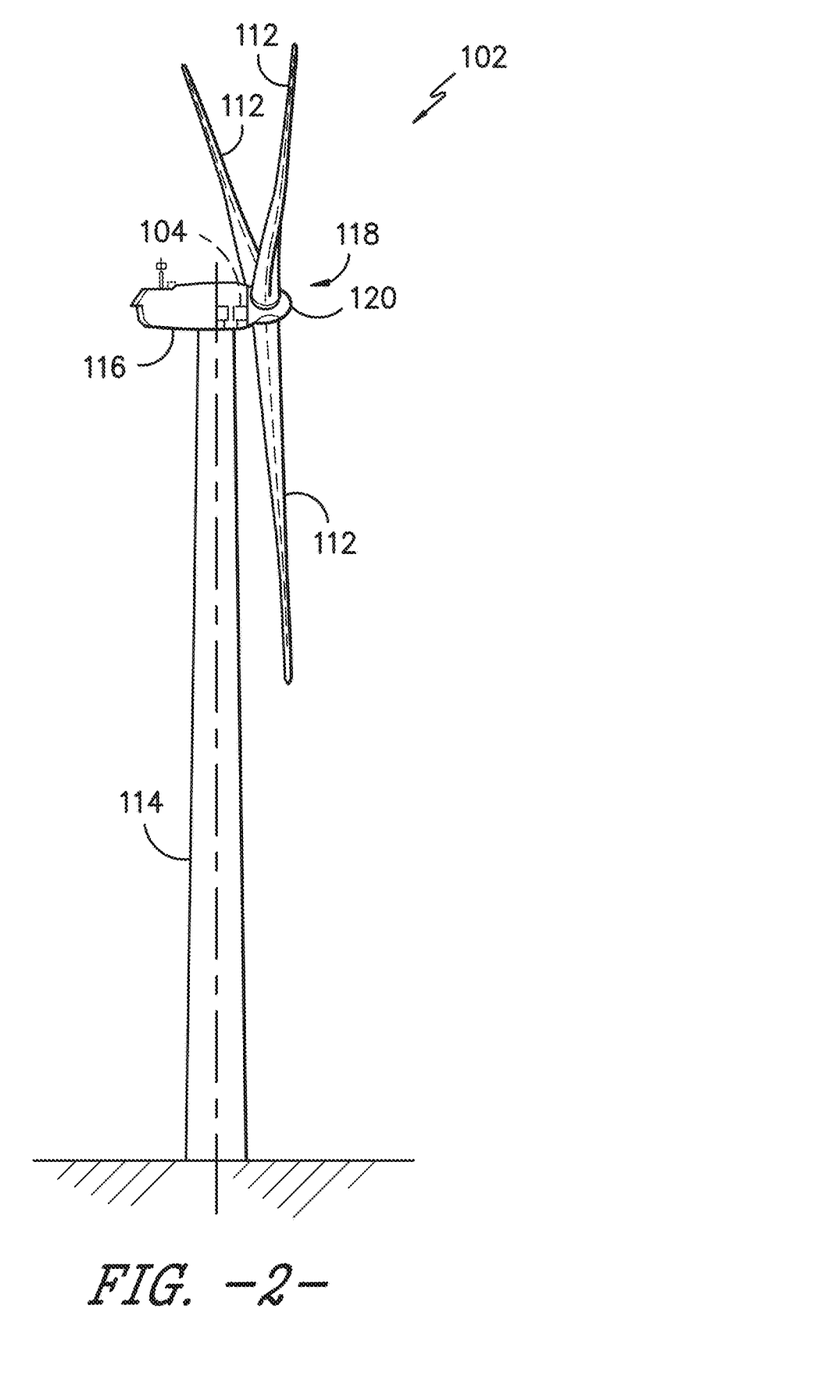
FIG. 2 illustrates a perspective view of one embodiment of a wind turbine according to the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm controller 108. Moreover, in one embodiment, the farm controller 108 may be coupled to the turbine controllers 104 through a network 110 to facilitate communication between the various wind farm components. The wind turbines 102 may also include one or more sensors 105 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 3:
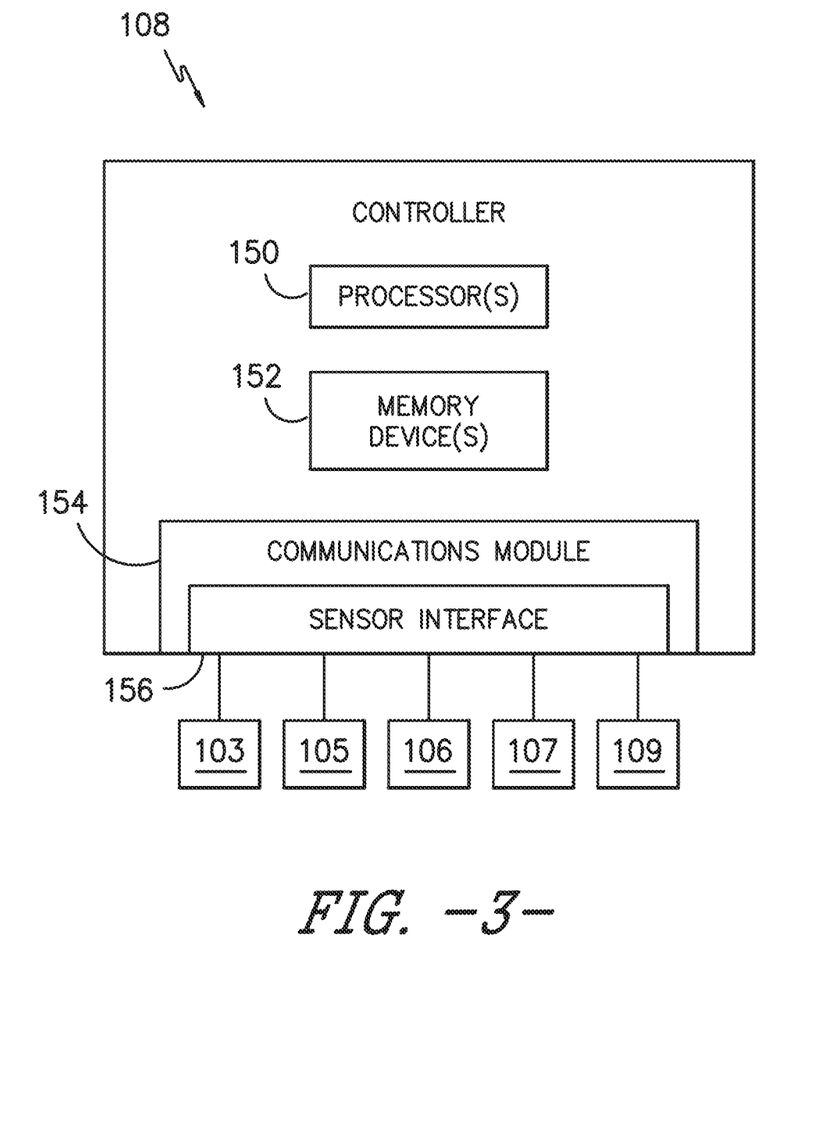
FIG. 3 illustrates a block diagram of one embodiment of a controller of a wind turbine and/or or wind farm according to the present disclosure.

Referring now to FIG. 3, there is illustrated a block diagram of one embodiment of suitable components that may be included within the farm controller 108 and/or the turbine controller(s) 104 in accordance with aspects of the present disclosure. As shown, the controller 108 may include one or more processor(s) 150 and associated memory device(s) 152 configured to perform a variety of computer-implemented functions (e.g., performing the methods, steps, calculations and the like and storing relevant data as disclosed herein). Additionally, the controller 108 may also include a communications module 154 to facilitate communications between the controller 108 and the various components of the wind turbine 102. Further, the communications module 154 may include a sensor interface 156 (e.g., one or more analog-to-digital converters) to permit signals transmitted from one or more sensors 103, 105, 107, 109 (such as the sensors described herein) to be converted into signals that can be understood and processed by the processors 150. It should be appreciated that the sensors 103, 105, 107, 109 may be communicatively coupled to the communications module 154 using any suitable means. For example, as shown, the sensors 103, 105, 107, 109 are coupled to the sensor interface 156 via a wired connection. However, in other embodiments, the sensors 103, 105, 107, 109 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller 108 to perform various functions as described herein. Moreover, the network 110 that couples the farm controller 108, the turbine controllers 104, and the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

Figure 4:
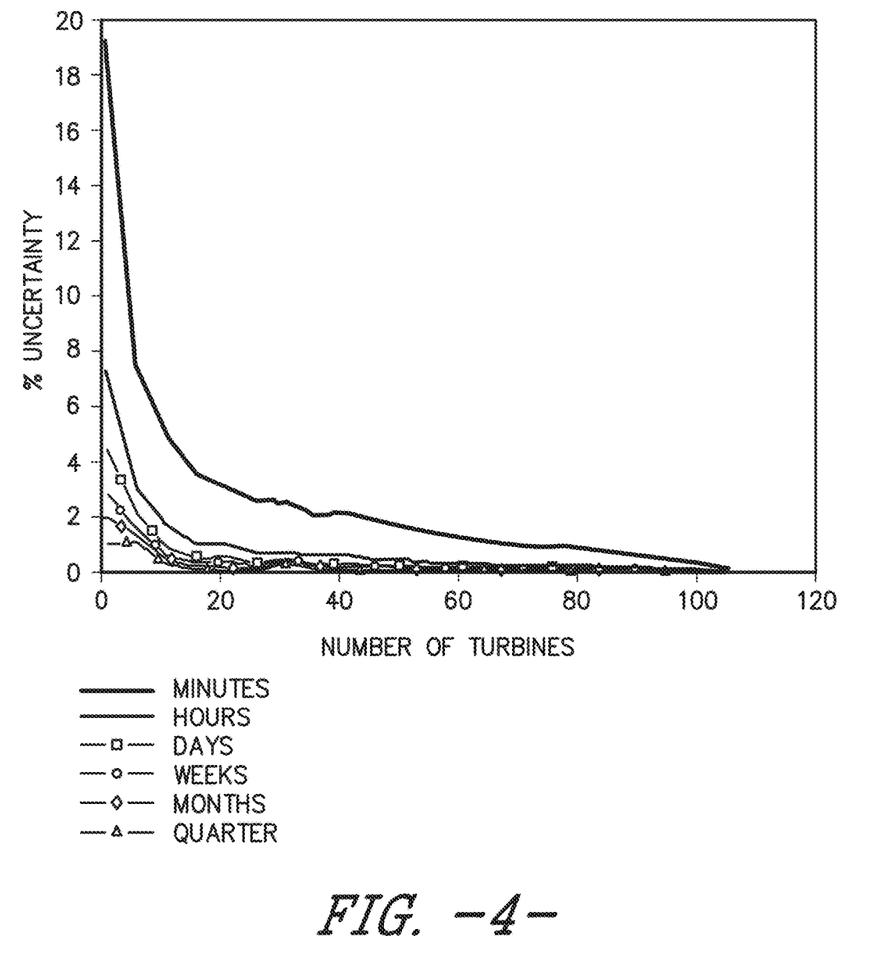
FIG. 4 illustrates a graph of one embodiment of the percent (%) uncertainty of the AEP change in response to one or more upgrades as a function of the number of wind turbines according to the present disclosure.

In addition, the farm controller 108 is configured to obtain or collect data from the sensors 103, 105, 107, 109 and/or other data sources such as turbine empirical models. Employing these inputs, the farm controller 108 is configured to determine one or more baseline models of performance of the wind farm 100 that can be used to validate farm-level performance for the wind farm 100 (e.g. farm-level power output). More specifically, the farm controller 108 baselines wind turbine performance using multi-feature estimation that normalizes AEP uncertainty estimates and does not rely solely on nacelle anemometer estimates or expensive additional sensors. In one embodiment, for example, the present disclosure provides a unified paradigm which leverages and fuses the best sensors available using machine learning algorithms. Thus, the farm controller 108 is configured to leverage big data and numerous sensors to improve accuracy of estimates regardless of the machine-learning model used. For example, as shown in FIG. 4, as the number of wind turbines 102 used to collect operating data increases, the percent (%) uncertainty decreases. In addition, as shown by the varying line types, as the time period for collecting data increases (e.g. from minutes to years), the % uncertainty decreases. Thus, the more relevant, good quality sensors used, and the more data pooled in like conditions the lower the predictive error of the model will be.

Figure 5:
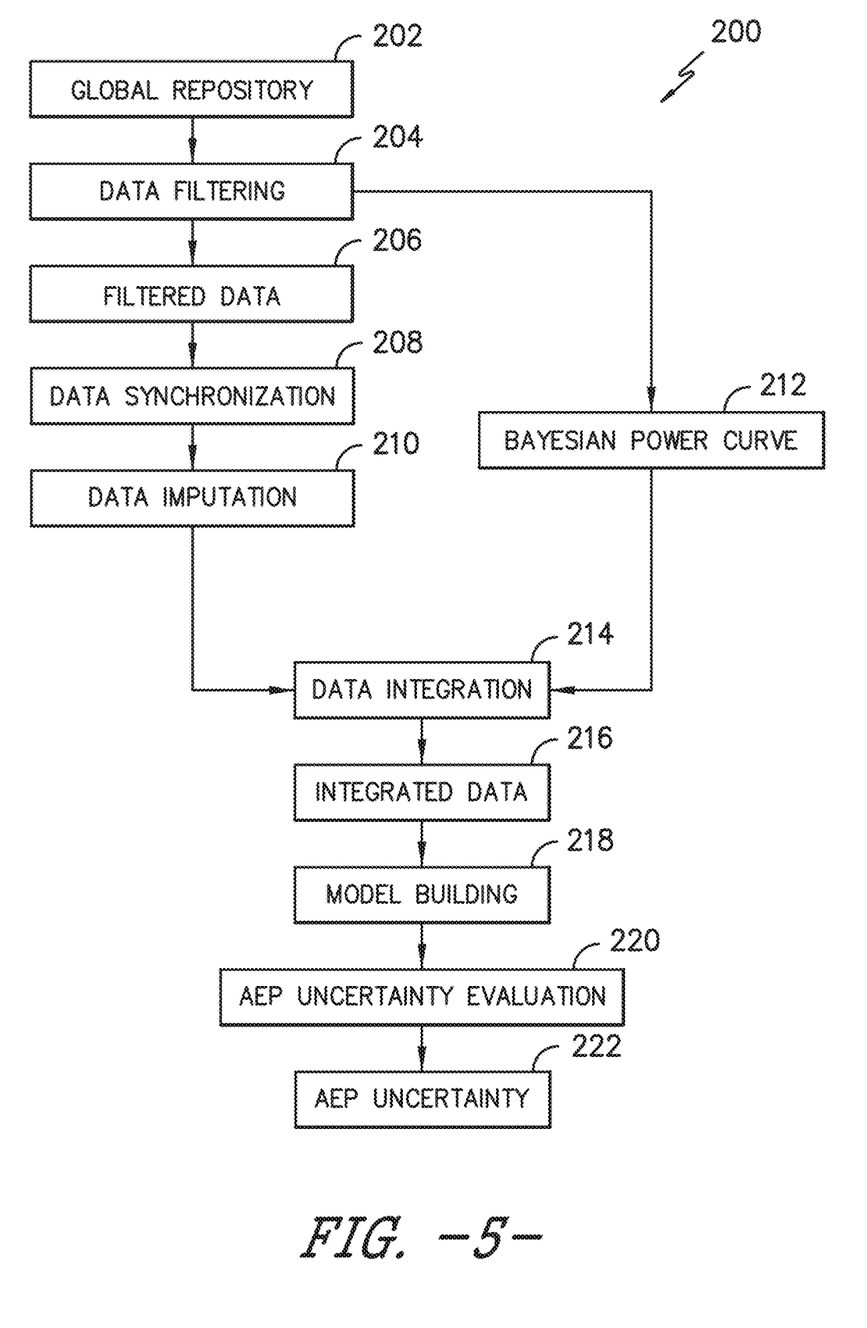
FIG. 5 illustrates a flow diagram of one embodiment of a method for validating wind farm performance measurements according to the present disclosure.

Referring now to FIG. 5, a simplified flow chart illustrating one embodiment of a method 200 for validating performance improvement measurements of the wind farm 100 according to the present disclosure is illustrated. As shown at 202, the farm controller 108 may include a global repository configured to collect and store the operating data collected from the sensors 103, 105, 107, 109. It should be understood that the wind turbine operating data may include any relevant operating data concerning the wind turbines 102 including but not limited to a pitch angle, generator speed, power output, torque output, air density, temperature, pressure, wind speed, wind peaks, wind turbulence, wind shear, wind direction, or similar.

At 204, the operating data may be filtered to provide filtered data 206. For example, in one embodiment, the data may be filtered for a variety of reasons including but not limited to: when one of the wind turbines 102 is not fully operational during a certain time interval (e.g. a 10-minute interval), when curtailment is detected, and/or when data points have very low wind speeds (e.g. less than 2 meters/second). It should be understood that the data may be filtered using any other suitable filter parameters in addition to those specifically described herein.

At 208, the data may be optionally synchronized or harmonized so as to establish consistency among the data collected from multiple sources. Further, at 210, the farm controller can be configured to impute data when missing values exist in the historical data. For example, the initial filtering described above may create gaps in the operating data. Since various embodiments of the present disclosure require estimating the power from one or more wind turbine (s) of interest and using information from neighboring turbines, the absence of measurements at a given time interval requires that the corresponding data record be completely removed, thereby leading to a significant loss of data. Thus, the farm controller 108 is configured to impute the missing data, i.e. substitute missing values with estimated values to obtain a more complete dataset for modeling and analysis. It should be understood that any imputation methods known in the art may be used. For example, in one embodiment, the missing data may be imputed using the k-nearest neighbor algorithm. Such an algorithm replaces missing data of a given turbine with a weighted mean of measurements from its k nearest-neighbors. In certain embodiments, the weights are inversely proportional to its Euclidean distance from the neighboring turbines.

In additional embodiments (e.g. when using wind speed data from neighboring turbines), linearization of the operating data may be useful prior to incorporation into the power model. For example, as shown at 212, a Bayesian power curve methodology may be utilized to linearize the operating data to produce power estimates for input into modeling algorithms. At 214, linear as well as non-linear data are integrated to provide integrated data 216.

At 218, one or more statistical models are built to estimate a performance measurement improvement (e.g. power output) from an individual wind turbine 102. For example, in a particular embodiment, stepwise linear regression may be utilized to estimate power output from an individual wind turbine 102. Generally, stepwise linear regression adds or removes features one at a time in an attempt to get the best regression model without over fitting. Further, stepwise regression typically has two variants, including forward and backward regression, both of which are within the scope and spirit of the invention. For example, forward stepwise regression is a step-by-step process of building a model by successive addition of predictor variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling a response variable.

Another statistical method that may be used to validate performance measurement improvement (e.g. power output) of the wind farm 100 is a least absolute shrinkage and selection operator (LASSO) algorithm. Generally, a LASSO algorithm minimizes the residual sum of squares subject to a constraint that the sum of the absolute value of the coefficients is smaller than a constant. Still another statistical algorithm that may be used to validate the performance measurement improvements from the wind farm 100 is a M5 Prime (M5P) algorithm, which is a tree-based regression algorithm that is effective in many domains. For example, whereas stepwise linear regression produces a single global linear model for the data, tree based regression algorithms perform logical tests on features to form a tree structure. Generally, the M5P algorithm utilizes a linear regression model at each node of the tree, providing more specialized models.

Figure 6:
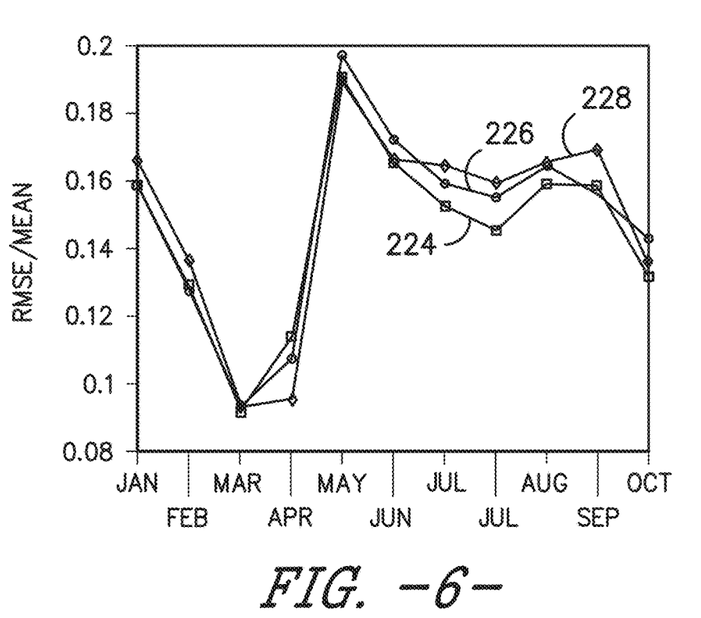
FIG. 6 illustrates a graph of one embodiment of the mean power output for a plurality of statistical algorithms according to the present disclosure.

Referring now to FIG. 6, sample results from the statistical algorithms used to validate power output, namely stepwise linear regression (line 224), LASSO (line 226), and M5P (line 228), are compared. As shown, the stepwise algorithm 224 performs as well as the more complicated LASSO (line 226) and M5P (line 228) algorithms for a particular turbine, with some variation. Further, as shown, the LASSO (line 226) and M5P (line 228) algorithms provide similar power estimates for the wind farm 100. In some months, however, M5P (line 228) performed best, whereas in other months, LASSO 226 performed better. It should be understood that the various statistical models described herein are provided for example only and any other statistical models are within the spirit and scope of the invention.

Figure 7:
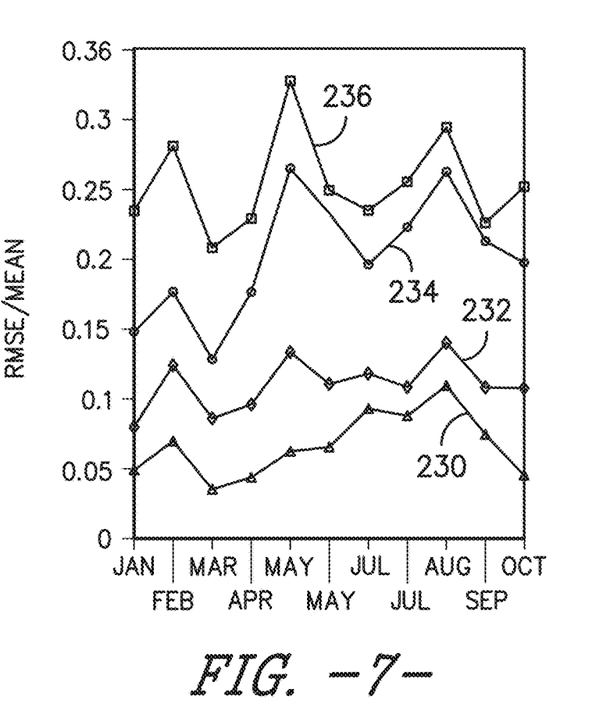
FIG. 7 illustrates a graph of another embodiment of the mean power output for a plurality of statistical algorithms using different features according to the present disclosure.

Referring now to FIG. 7, the root mean squared error (RMSE) of predicted power divided by mean power produced in a given month of data for various models are illustrated, which can be interpreted as a measure of prediction error normalized by output power. In certain embodiments, utilization of approximately one months' worth of training data provides effective means of predicting a turbine's power for a 100-turbine farm, however, it should be understood that any amount of data may be used to develop each of the models. For example, as shown in the illustrated embodiment, a wind turbine 102 trained using January data may generate approximately 5% error on the training when all features, including the Bayesian Power Curve power estimate, are included in the feature set (line 230). However, when only wind speed and power are used (line 232), the error on the training data is about 8%, moving to 15% when only power from other turbines is used (line 234). If only wind speed is used in the model (line 236), the error in predicting a 10-minute interval from the model against training data is over 23%. When these models trained in January are applied to test data in the other months of the year the error characteristic is as shown. Thus, as shown in the illustrated embodiment, the optimal results were obtained when the onboard nacelle anemometer and the Bayesian Power Curve Estimate were included as features (line 230).

Figure 8:
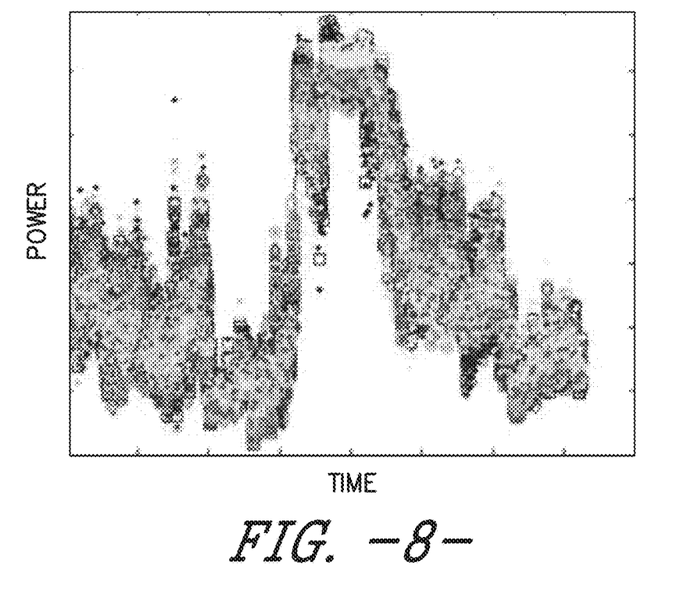
FIG. 8 illustrates a graph of one embodiment of the power output versus time for a plurality of baseline models according to the present disclosure.
Figure 9:
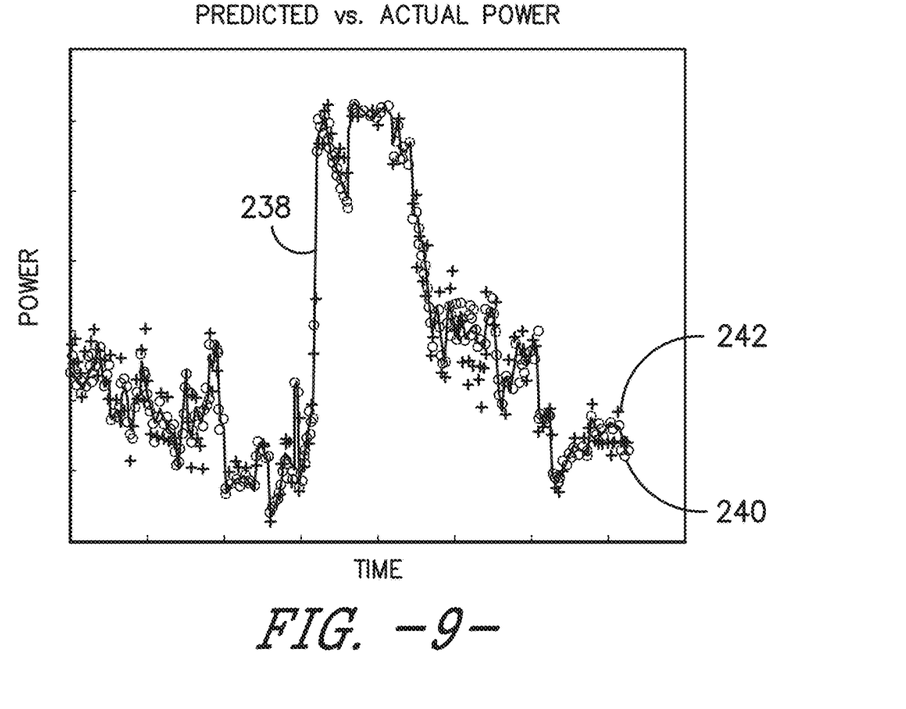
FIG. 9 illustrates a graph of one embodiment of the power output versus time for an optimal baseline model according to the present disclosure.

Referring now to FIGS. 8 and 9, the present disclosure includes comparing and analyzing the plurality of baseline models and selecting the model that provides the best or most accurate performance to validate farm power output improvement in response to an upgrade, i.e. the optimal baseline model. For example, as shown in FIG. 8, the farm controller 108 measures a plurality of operating data from one or more subsets of wind turbines 102 within the wind farm 100. The controller 108 can then generate a plurality of baseline models for each of the subsets of data. In certain embodiments, the controller 108 is configured to validate each of the baseline models by applying new data to each model (that was not used in creating the baseline models) to determine how well each model predicted total farm power output. For example, in one embodiment, a first operating data set may include a first subset and a second subset. Thus, one of the baseline models may be generated using the first subset and then validated using the second subset. For example, in a wake controls embodiment, a baseline model (i.e. where wake controls are not in effect) may be exercised against new data where wake controls are also not in effect such that wind farm power output can be predicted with a small margin of error. In alternative embodiments, the controller 108 can validate the baseline models based on training data alone such that verification using new data (e.g. the second subset) is not necessary.

In another embodiment, the farm controller 108 may also eliminate baseline models that contain one or more wind turbines that have been modified by one or more upgrades. In still additional embodiments, the farm controller 108 can strategically provide or withhold (e.g. turn on and off) certain upgrades or modifications (e.g. wake controls) from one or more wind turbines in the wind farm in order to provide a basis for assessing farm performance at a desired accuracy. Further, the extent to which modifications are left in place or removed gives the ability to trade off validation accuracy for farm performance improvement.

Referring back to FIG. 5, once the baseline models have been built and the optimal baseline model chosen, the AEP uncertainty evaluation 220 begins to determine the AEP uncertainty 222. Applying the trained or optimal model to the test data, the controller 108 can determine the baseline predicted power that is representative of the power estimate if no upgrade has been applied. Further, the residual power is defined as the difference between the observed or actual power and the baseline predicted power, which representative of the power change due to the upgrade and which is used to evaluate the AEP change. For example, as shown in FIG. 9, actual power 238 is compared with predicted power 242 as determined by the optimal baseline model. In the illustrated embodiment, the optimal baseline model is based on the predicted power 242 as determined by sensors from two of the wind turbines 102. In addition, line 240 represents the estimate of total farm power when half of the wind turbines 102 are used in the model to predict power. As shown, the predicted power 242 as determined by the optimal model is similar to the actual power 238 as determined by one or more sensors.

Figure 11:
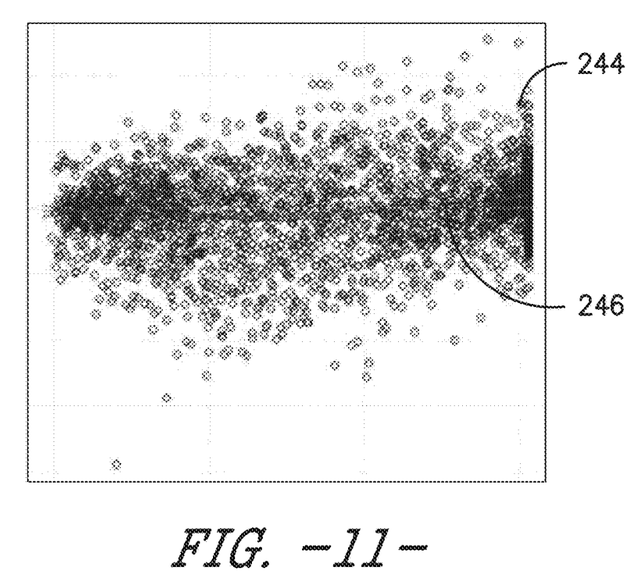
FIG. 11 illustrates a graph of one embodiment of the mean residual between actual and predicted power according to the present disclosure.

Referring now to FIG. 10, the optimal baseline model is then applied to the wind farm 100. More specifically, as shown, the farm controller 108 determines the control sensors for a given sample within the set of control turbines (as indicated by markers 252) and then applies the optimal baseline model thereto. The farm controller 108 can then model the error 244 or residual between actual and predicted power to determine the performance change/uncertainty as shown in FIG. 11. It should be understood that accuracy of the baseline models generally improves with more data although any amount of data may be used to build the model. In certain embodiments, the controller 108 may also determine the mean error 246 between the actual and predicted power to determine a mean uncertainty value.

Figure 12:
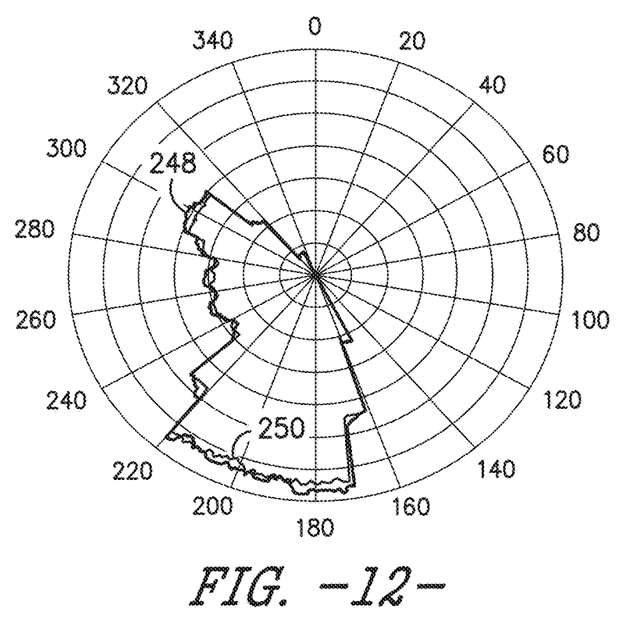
FIG. 12 illustrates a graph of one embodiment of actual and predicted power output as a function of wind sector according to the present disclosure.
Figure 13:
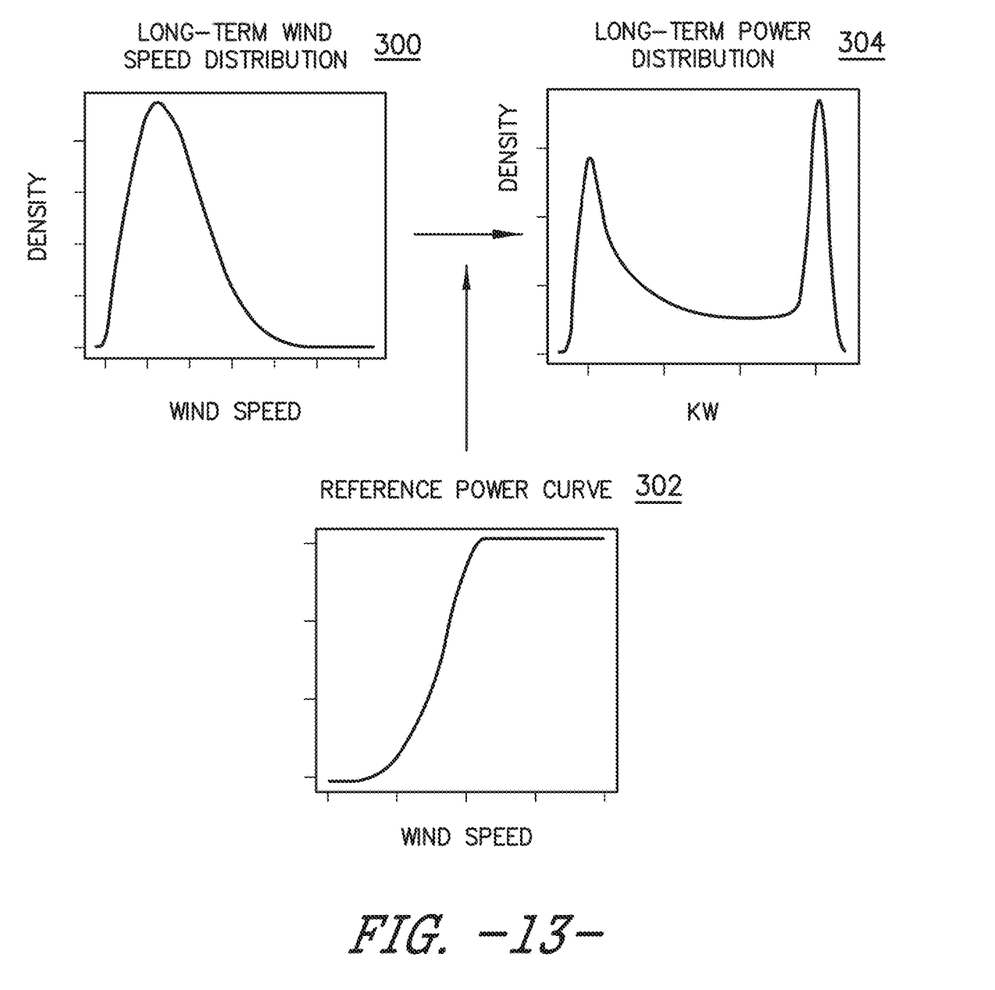
FIG. 13 illustrates one embodiment a plurality of graphs of long-term wind speed distribution and a reference power curve used to integrate the power change with respect to a long-term power distribution according to the present disclosure.

In additional embodiments, as shown in FIGS. 12 and 13, the farm controller 108 can calculate the AEP change before and after an upgrade by integrating the power change with respect to a long-term power distribution 304. For example, in one embodiment, the farm controller 108 transforms a pre-specified long term wind speed distribution 300 based on a reference power curve 302 as shown. In addition, the controller 108 may determine the AEP as a function of wind sector as shown in FIG. 12. More specifically, as shown, line 248 represents AEP with wake controls, whereas line 250 represents AEP without wake controls. Thus, the controller 108 may be configured to compute the baseline models for every possible sector of wind direction. For example, in one embodiment, the controller 108 may determine a set of models for the wind sector having a median wind direction of 10 to 20 degrees. The farm controller 108 can then train the models on data where the median wind direction is between 10 and 20 degrees and use the models to predict farm output when the wind direction is between 10 to 20 degrees. In such an embodiment with 10-degree wind sectors, there are 36 different model sets, each with a model of farm output using every permutation and combination of sensor inputs. Still other wind sectors could be used, for example, as shown in FIG. 12 (i.e. 20-degree sectors), in which case, there would be 18 different model sets, and so on.

Figure 14:
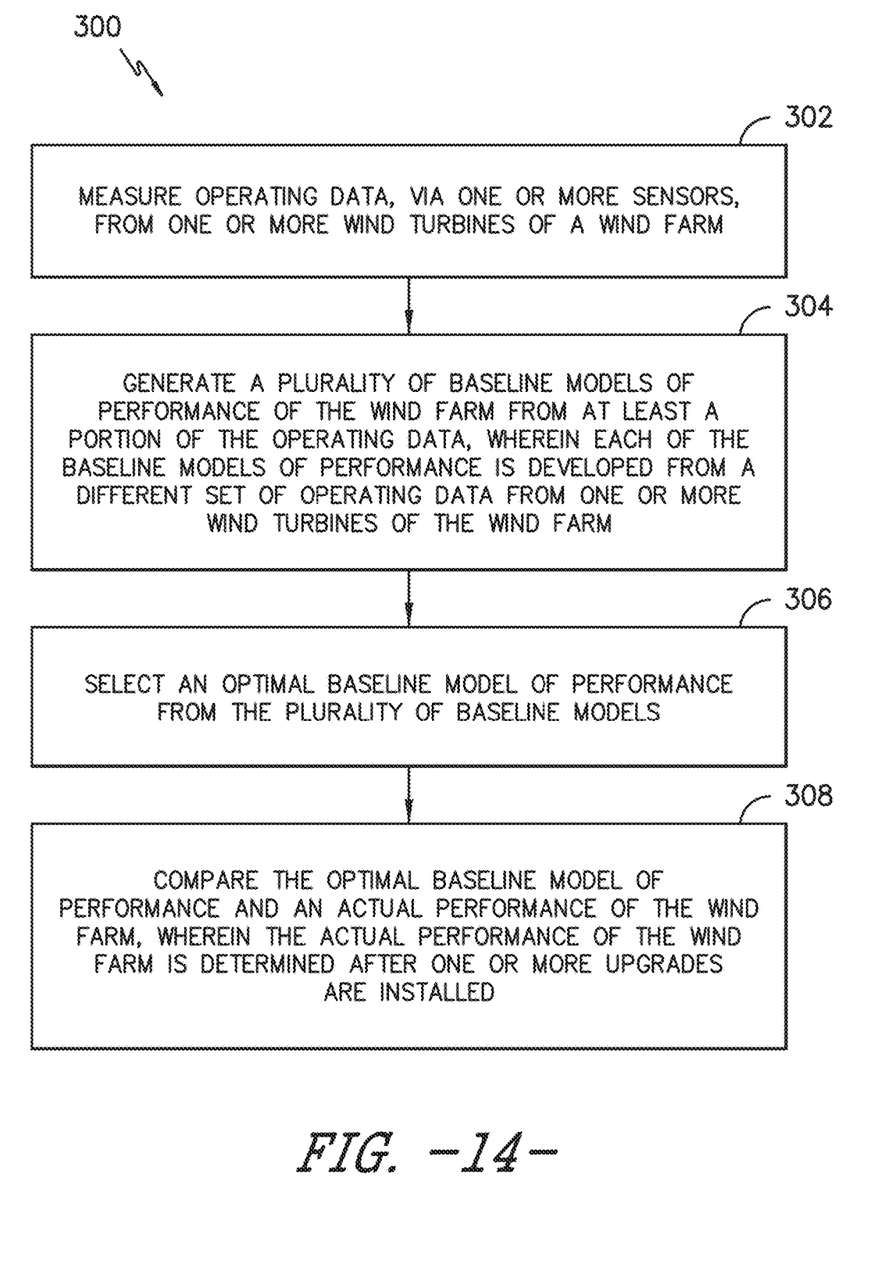
FIG. 14 illustrates a flow diagram of another embodiment of a method for validating wind farm performance measurements according to the present disclosure.

Referring now to FIG. 14, a flow diagram of a method 300 for validating wind farm performance improvement measurements produced by one or more upgrades is illustrated. At 302, the method 300 includes measuring operating data, via one or more sensors, from one or more wind turbines of a wind farm. At 304, the method 300 includes generating a plurality of baseline models of performance of the wind farm from at least a portion of the operating data, wherein each of the baseline models of performance is developed from a different set of operating data from one or more wind turbines of the wind farm. At 306, the method 300 includes selecting, via the processor, an optimal baseline model of performance from the plurality of baseline models. At 308, the method 300 includes comparing the optimal baseline model of performance and an actual performance of the wind farm, wherein the actual performance of the wind farm is determined after the one or more upgrades are installed.

As mentioned, the system and method as described herein may also be configured to identify one or more performance measurements (e.g. errors) of the wind farm, as well as performance improvements. As described herein, the term "error" is meant to encompass its ordinary meaning as known in the art, as well as misconfigurations, material or software failures, or other problematic circumstances that may cause sub-par performance of the wind farm. In still additional embodiments, an error may be occurring where the wind farm is performing below baseline expectations for a variety of reasons. In one implementation, for example, the information from the farm validation methodology can be used to determine when a wind turbine in the wind farm or the entire wind farm is not configured correctly or has suffered from a casualty.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for validating one or more wind farm performance measurements produced by one or more upgrades, the method comprising:
    measuring operating data, via one or more sensors, from one or more wind turbines of a wind farm;
    generating, via a processor, a plurality of baseline models of performance of the wind farm from at least a portion of the operating data, wherein each of the baseline models of performance is developed from a different portion of operating data from one or more wind turbines of the wind farm;
    selecting, via the processor, an optimal baseline model of performance from the plurality of baseline models; and,
    comparing, via the processor, the optimal baseline model of performance and an actual performance of the wind farm, wherein the actual performance of the wind farm is determined after one or more wind turbines of the wind farm are modified by the one or more upgrades that have been installed for the one or more wind turbines of the wind farm, and wherein comparing the optimal baseline model of performance and the actual performance of the wind farm comprises determining a difference between an optimal baseline model of power output and an actual power output of the wind farm, wherein the difference is reflective of a change in the power output produced by the one or more upgrades.

2. The method of claim 1, wherein the performance measurements comprise a power output of the wind farm.

3. The method of claim 1, wherein generating the plurality of baseline models of performance of the wind farm from the operating data further comprises:

selecting one or more wind turbines for each of the baseline models;
selecting subsets of operating data relating to each of the selected wind turbines; and
creating each of the baseline models from the subsets of operating data.

4. The method of claim 3, further comprising evaluating, via the processor, each of the baseline models of performance of the wind farm.

5. The method of claim 4, wherein evaluating each of the baseline models further comprises comparing each of the baseline models to additional subsets of operating data relating to each of the selected wind turbines for each baseline model, wherein the additional subsets of operating data are not used in creating the baseline models.

6. The method of claim 3, further comprising eliminating baseline models that contain the one or more wind turbines modified by the one or more upgrades.

7. The method of claim 1, further comprising providing or withholding the one or more upgrades to or from the wind turbines of the wind farm in order to provide a basis of assessing farm performance at a desired accuracy.

8. The method of claim 1, wherein the one or more upgrades comprise any one of or a combination of the following: rotor blade chord extensions, software upgrades, controls upgrades, hardware upgrades, wake controls, aerodynamic upgrades, blade tip extensions, vortex generators, winglets.

9. The method of claim 1, further comprising generating baseline models of power output for a plurality of wind direction sectors.

10. The method of claim 1, developing a long-term power distribution by transforming a pre-specified long-term wind speed distribution based on a reference power curve.

11. The method of claim 10, further comprising determining an annual energy production (AEP) change of the wind farm in response to the one or more upgrades by integrating the change in power output produced by the one or more upgrades with respect to the long-term power distribution.

12. The method of claim 1, wherein the one or more sensors comprise any one of or a combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes.

13. A method for identifying one or more wind farm performance measurements, the method comprising:
    measuring operating data, via one or more sensors, from one or more wind turbines of the wind farm;
    generating, via a processor, a plurality of baseline models of power output of the wind farm from at least a portion of the operating data, wherein each of the baseline models is developed from a different portion of the operating data;
    evaluating, via the processor, performance of each of the baseline models by comparing each baseline model to an actual power output of the wind farm;
    selecting, via the processor, an optimal baseline model based on the evaluation; and
    identifying, via the processor, one or more wind farm performance measurements of the wind farm based on the optimal baseline model, wherein the wind farm performance measurements are indicative of an error occurring in the wind farm.

14. The method of claim 13, wherein generating the plurality of baseline models of power output of the wind farm from the operating data further comprises:
   selecting one or more wind turbines for each of the baseline models;
   selecting subsets of operating data relating to each of the selected wind turbines; and creating each of the baseline models from the subsets of operating data.

15. The method of claim 14, wherein evaluating performance of each of the baseline models of power output further comprises comparing each of the baseline models to additional subsets of operating data relating to each of the selected wind turbines for each baseline model, wherein the additional subsets of operating data are not used in creating the baseline models.

16. The method of claim 13, further comprising eliminating baseline models that contain selected wind turbines having one or more upgrades.

17. The method of claim 16, wherein the one or more upgrades comprise any one of or a combination of the following: rotor blade chord extensions, software upgrades, controls upgrades, hardware upgrades, wake controls, aerodynamic upgrades, blade tip extensions, vortex generators, winglets.

18. The method of claim 17, further comprising generating baseline models for a plurality of wind direction sectors.

19. A system for validating one or more wind farm performance measurements produced by one or more upgrades, the system comprising:
   a plurality of sensors configured to measure operating data from one or more wind turbines in a wind farm; and
   a controller configured to perform a plurality of operations, the plurality of operations comprising:
      generating a plurality of baseline models of performance of the wind farm from at least a portion of the operating data, wherein each of the baseline models of performance is developed from a different portion of operating data from one or more wind turbines of the wind farm,
      selecting an optimal baseline model of performance from the plurality of baseline models, and
      comparing the optimal baseline model of performance and an actual performance of the wind farm, wherein the actual performance of the wind farm is determined after one or more wind turbines of the wind farm are modified by the one or more upgrades that have been installed for the one or more wind turbines of the wind farm, and wherein comparing the optimal baseline model of performance and the actual performance of the wind farm comprises determining a difference between an optimal baseline model of power output and an actual power output of the wind farm, wherein the difference is reflective of a change in the power output produced by the one or more upgrades.

* * * * *